May 7, 1940.  F. A. PARKHURST  2,199,648
MACHINE FOR SLITTING AND TRIMMING PLASTIC WEBS
Filed Dec. 9, 1938

Inventor:
Frederic A. Parkhurst
By Pike, Colmer & Gray
Attorneys

Patented May 7, 1940

2,199,648

UNITED STATES PATENT OFFICE 2,199,648

MACHINE FOR SLITTING AND TRIMMING PLASTIC WEBS

Frederic A. Parkhurst, Suffield, Conn., assignor to Monsanto Chemical Company, St. Louis, Mo., a corporation of Delaware Application December 9, 1938, Serial No. 244,832

5 Claims. (Cl. 164—38)

My invention relates to an improvement in machines for slitting and trimming plastic webs.

Plastic materials, such as plasticized polyvinyl acetal resins, are formed into thin webs in a variety of ways. Such webs are used to make laminated glass and for similar purposes requiring great uniformity of gauge and precise measurements. The webs must therefore be made and handled with extreme care so as not to introduce distortions which injure the material. Extremely minute variations may destroy their utility.

These plastic materials, when first formed, have a very high degree of uniformity of thickness. They are, however, quite sticky, or tacky, and have the peculiar property of stretching under slight stresses and regaining their original size and shape so slowly that if stretched over the whole or a part of their area it is difficult or impossible to use them.

The necessity for slitting and trimming these webs therefore creates a very difficult problem. It has heretofore been found difficult, if not impossible, to cut such webs cleanly and evenly unless they were held under tension, but the requisite tension tended to produce stretching and distortion. Thus in either event, the webs were subject to variation in gauge and loss of utility.

Machines of the type used for slitting paper webs have been considered in connected with this problem but have not yielded any solution. These machines either cut the paper web as it is being wound on a winding roll, or draw the paper, under considerable tension, between two cutting elements, or else the winding roll is mounted to bear on a bed roll, which results in a varying pressure on the web as the roll is wound. The knives used are rotatable discs which have a sort of punching effect on the paper. These machines while suitable for cutting paper, which is inelastic and may be pulled or pressed, are not suitable for slitting plastic webs. Machines for slitting plastics must be constructed with wholly different problems in mind, occasioned by the peculiar properties of the material.

As far as is known to me no satisfactory way has previously been discovered by which a plastic web can be cut cleanly and uniformly without distortion. A slack web will not cut evenly, a taut web thins and loses its gauge.

Accordingly it is the object of my invention to provide means for slicing and trimming plastic webs which will perform even, uniform cutting, without distortion of any kind.

As a result of experimentation, I have discovered that when a plastic web is held tightly and uniformly against the surface of a moving cylinder it can be slit evenly and accurately by a stationary knife without distortion. The marked success of my improved mechanism may be due to the fact that the web is, for some distance before and after the point of slicing, held tightly under slight tension evenly distributed. Thus the web is not so much pulled by a force acting in the direction of movement as it is firmly held to a curved, moving surface, and which on such a surface is not subjected to any strain except that resulting from the form and the movement of the supporting surface. I have also discovered that the cutting knife should not be forced or punched through the material, but should be drawn lightly over the material. In practice I employ a knife having a straight edge which is inclined to form an acute angle with the top surface of the approaching web, i. e., that surface which does not rest on the bed roll. It will thus be seen that the knife is drawn over the web, and gradually penetrates it at a point slightly removed from the point of original contact. The web is held under slight tension for some distance before and after the cutting point, but this tension is due to the web being tightly wrapped on the surface of the bed roll. The tension which holds the web against the roll is sufficient to hold the stock firmly in place on its surface with little or no tendency to slip or slide on the roll, this being in part due to the friction between the web and the roll, the coefficient of friction of the materials in question and of the roll being usually relatively high. Upon leaving the bed roll, the web is immediately transferred to the winding roll, and tight wrapping of the web on both rolls is maintained by a constant and uniform pressure exerted by the bed roll on the material being wound. In my preferred form, this constant and uniform application of pressure is obtained by counterbalancing the bed-roll support. Equivalent means may be used, however, to accomplish the same result.

The invention will be more clearly understood from the following description in conjunction with the accompanying drawing. It is to be understood that the invention is not limited to the details of construction and arrangement of parts illustrated in the drawing, since the invention as defined by the claims hereinafter appended may be otherwise embodied without departure from the spirit and scope thereof.

It is also to be understood that the terms here used are for the purpose of description and not of limitation, and it is not intended to limit the invention claimed herein beyond the requirements of the prior art.

Figure 1:
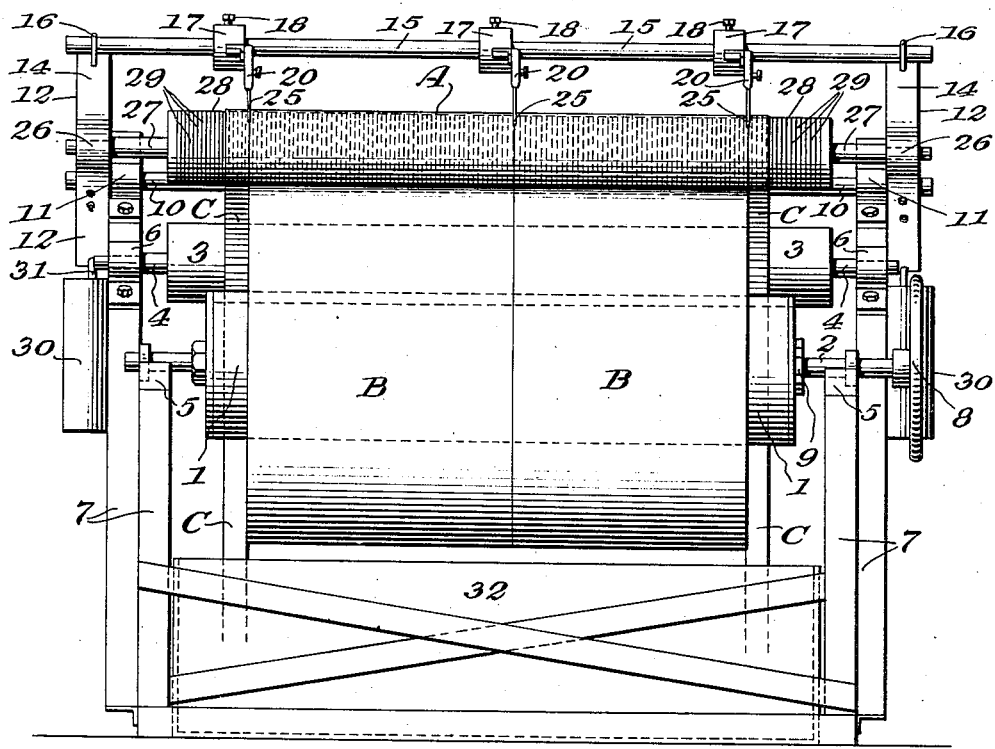
Fig. 1 is a front elevational view of a device embodying the invention.
Figures 2, 3:
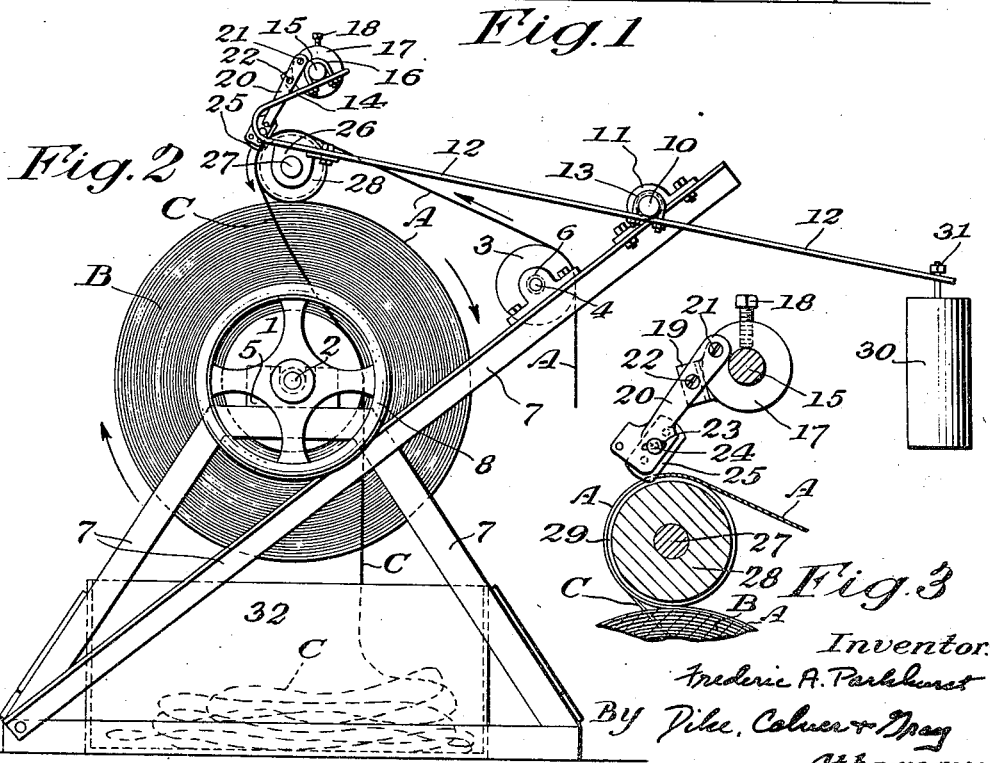
Fig. 2 is a side elevational view.
Fig. 3 is an enlarged side elevation partly in section of the cutting elements of said device.

As shown in the drawing, a winding roll 1 mounted on a shaft 2 and an idler roll 3 mounted on a shaft 4 are supported by bearings 5, 5 and 6, 6 attached to a frame 7. A hand-wheel 8 fixed to one end of the shaft 2 provides means for turning said shaft by hand, and a gear 9, fixed to an intermediate portion of said shaft 2 adjacent to the end of the winding roll or core 1 permits said roll to be turned by motive power from some suitable source (not shown). A rod 10 supported in bearings 11, 11 carries mounted thereon lever arms 12, 12 pivotally connected to said rod 10 by U bolts 13, 13. Each of the lever arms 12, 12 supports a weight container 30, attached thereto by a bolt 31 at a point near the end of the lever arm 12 farthest from the winding roll 1. The ends of the lever arms 12, 12 nearest the winding roll 1 are bent to provide upper supporting brackets 14, 14 to which a rod 15 is secured by U-bolts 16, 16. The rod 15 carries slidably mounted thereon the knife-supports 17, provided with set screws 18, for gripping the rod 15 and thereby holding the knife-supports 17, in the desired position. The supports 17 are also provided with lugs 19. Knife handles 20 are fastened to said lugs 19 and said supports 17 by screws 21 and 22. A thumb screw 24 laterally slidable in the slot 23 passes through said slot and carries a razor blade 25.

Bearings 26—26 secured to or forming part of the lever arms 12, 12 support a shaft 27 on which is secured a grooved bed roll 28 in which the narrow grooves 29, approximately one thirty-second of an inch wide, three thirty-seconds of an inch deep, and one quarter of an inch apart, extend laterally of said bed roll about the circumference thereof. The grooves 29 serve as guides for the razor blade 25.

In operation, the plastic web A is drawn over the idler roll 3, drawn tightly over the grooved bed roll 28 and wound about the winding roll or core 1. The bed roll 28 and the core 1 revolve in opposite directions; as shown, the core 1 revolves clockwise and the roll 28 revolves counter-clockwise. The web A is thus wrapped about more than half the circumference of the bed roll 28, and on leaving this roll is passed directly, without stretching, to the winding roll. As the web A is wrapped about the core or winding roll 1, it forms a roll B of wound plastic webbing, and as the roll B increases in size, the grooved bed roll 28 rides lightly over the surface thereof, rising slightly as each layer of the web is added to the roll B. The weight container 30 is provided with weights (not shown) which offset the weight of the bed roll and cutting elements, avoiding undue compression of the web, while just enough pressure is allowed to ensure tight wrapping of the web A about the bed roll 28 and tight winding about the roll 1. As the web A passes over the grooved roll 28 it is slit as desired by the razor blade 25 which passes through said web and into the grooves 29 which guide said blade. The desirable portions of the slit web A are then wound into the roll B as aforesaid, the edge trimmings C from said web drop into a suitable container underneath, such as the pan 32.

I claim:

1. In a machine for slitting and trimming a web of plastic material, in combination, a source of supply for the plastic web, a winding roll on which the web is wound, a grooved bed roll, a counter-balanced movable arm for positioning said bed roll to bear with substantially uniform pressure against the material wound on the winding roll, and a straight edged non-rotative knife guided in a groove in said bed roll, said bed roll being arranged with respect to the source of supply and the winding roll so that the stock is in contact with a substantial portion of the periphery of the bed roll and is held closely in contact therewith during the cutting operation.

2. In a machine for slitting and trimming a web of plastic material, in combination, a source of supply for the plastic web, a winding roll on which the web is wound, a grooved bed roll, a counter-balanced movable arm for positioning said bed roll to bear with substantially uniform pressure against the material wound on the winding roll, and a straight edged non-rotative knife guided in a groove in said bed roll, the edge of said knife being inclined to form an acute angle with the uncut surface of the web which does not touch the bed roll, said bed roll being arranged with respect to the source of supply and the winding roll so that the web is in contact with a substantial portion of the periphery of the bed roll and is held closely in contact therewith during the cutting operation.

3. In a machine for slitting and trimming a web of plastic material, in combination, a source of supply for the plastic web, a winding roll on which the web is wound, a grooved bed roll mounted to bear with substantially uniform pressure against the material wound on the winding roll, a non-rotative straight-edged knife whose edge is at an acute angle to the line of movement of the stock, a substantially straight edge of said knife cooperating with the grooves in the bed roll, said bed roll being arranged with respect to the source of supply and the winding roll so that the stock is in contact with a substantial portion of the periphery of the bed roll and is held closely in contact therewith during the cutting operation and means for controlling the pressure exerted by said bed roll against the web.

4. In a machine for slitting and trimming a web of plastic material, in combination, a source of supply for the web, a winding roll on which the web is wound, a grooved bed roll mounted to bear with substantially uniform pressure against the web as it is wound on the winding roll, and arranged with respect to the source of supply and the winding roll so that the web is in contact with a substantial portion of the periphery of said bed roll and is held closely in contact therewith during the cutting operation, a knife guided in a groove in said bed roll, and means for controlling the magnitude of the pressure exerted by said bed roll against the web as it is wound on the winding roll.

5. In a machine for slitting and trimming a web of plastic material, in combination, a winding roll on which the web is wound, a grooved bed roll, means for positioning said bed roll, means for adjusting the pressure with which said bed roll bears against said material wound on the winding roll, and a knife guided in a groove in said bed roll, said bed roll being arranged with respect to the source of supply and the winding roll so that the web is in contact with a substantial portion of the periphery of the bed roll and is held closely in contact therewith during the cutting operation.

FREDERIC A. PARKHURST.